(12) United States Patent
Che et al.

(10) Patent No.: US 7,133,241 B2
(45) Date of Patent: Nov. 7, 2006

(54) METHOD AND APPARATUS FOR OPTIMIZING RECORD QUALITY WITH VARYING TRACK AND LINEAR DENSITY BY ALLOWING OVERLAPPING DATA TRACKS

(75) Inventors: Xiaodong Che, Saratoga, CA (US); Wen-Chien David Hsiao, San Jose, CA (US); Yansheng Luo, Fremont, CA (US); Xiaoyu Sui, Fremont, CA (US); Samuel Wei-san Yuan, Saratoga, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 44 days.

(21) Appl. No.: 11/104,209

(22) Filed: Apr. 11, 2005

(65) Prior Publication Data

US 2006/0227449 A1 Oct. 12, 2006

(51) Int. Cl.
*G11B 21/02* (2006.01)
(52) U.S. Cl. ...................................... 360/75
(58) Field of Classification Search ................. 360/75, 360/51, 66, 77.01, 77.02, 78.04
See application file for complete search history.

(56) References Cited

U.S. PATENT DOCUMENTS

| | | | |
|---|---|---|---|
| 4,644,421 A | 2/1987 | Miwa et al. | |
| 4,897,748 A | 1/1990 | Takahashi et al. | |
| 5,293,281 A | 3/1994 | Behr et al. | |
| 5,777,813 A * | 7/1998 | Sun et al. | 360/66 |
| 5,828,511 A | 10/1998 | Bar | |
| 5,854,715 A | 12/1998 | Takagi | |
| 5,940,237 A | 8/1999 | Takagi | |
| 5,949,602 A * | 9/1999 | Ishioka et al. | 360/75 |
| 6,025,969 A * | 2/2000 | Ishioka et al. | 360/77.01 |
| 6,185,063 B1 | 2/2001 | Cameron | |
| 6,271,990 B1 | 8/2001 | Kikuiri | |
| 6,507,450 B1 | 1/2003 | Elliott | |
| 6,665,138 B1 * | 12/2003 | Kim | 360/77.02 |
| 6,735,031 B1 * | 5/2004 | Chainer et al. | 360/51 |
| 6,906,884 B1 * | 6/2005 | Yasuna et al. | 360/75 |
| 7,006,322 B1 * | 2/2006 | Sado | 360/75 |
| 2002/0071198 A1 | 6/2002 | Liu et al. | |

FOREIGN PATENT DOCUMENTS

JP    2000331433    11/2000

OTHER PUBLICATIONS

"Doubling of Hard Disk Drive Data Capacity in Multimedia Applications" IMB TDB, Jan. 1995, pp. 351ff.

* cited by examiner

*Primary Examiner*—Fred F. Tzeng

(57) ABSTRACT

A method and apparatus for optimizing data record quality on a disk for a pair of read and write heads, in which the write head is bigger, by adaptively varying linear and track density of overlapping recorded tracks to achieve a target storage capacity. In the method, target storage capacity and radial writing direction are selected. Read and write widths of heads are determined. A linear density and offset distance pairing for optimizing record quality at target storage capacity is determined, wherein offset distance is less than write width but greater than read width. The write head writes a track at the linear density, is offset in the radial direction by the offset distance, and the offset distance is stored. The write head writes a new track at the linear density. Offsetting, storing offset, and writing a new track are repeated until desired data is written into a cluster.

9 Claims, 13 Drawing Sheets

METHOD AND APPARATUS FOR OPTIMIZING RECORD QUALITY WITH VARYING TRACK AND LINEAR DENSITY BY ALLOWING OVERLAPPING DATA TRACKS

TECHNICAL FIELD

The present invention relates to the field of hard disk drive development, and more particularly to a method and apparatus for optimizing record quality with varying track and linear density by allowing overlapping data tracks.

BACKGROUND ART

Hard disk drives are used in almost all computer system operations. In fact, most computing systems are not operational without some type of hard disk drive to store the most basic computing information such as the boot operation, the operating system, the applications, and the like. In general, the hard disk drive is a device which may or may not be removable, but without which the computing system will generally not operate.

The basic hard disk drive model includes a storage disk or hard disk that spins at a designed rotational speed. An actuator arm with a suspended slider is utilized to reach out over the disk. The arm carries a head assembly that has a magnetic read/write transducer or head for reading/writing information to or from a location on the disk. The complete head assembly, e.g., the suspension and head, is called a head gimbal assembly (HGA).

In operation, the hard disk is rotated at a set speed via a spindle motor assembly having a central drive hub. There are tracks at known intervals across the disk. When a request for a read of a specific portion or track is received, the hard disk aligns the head, via the arm, over the specific track location and the head reads the information from the disk. In the same manner, when a request for a write of a specific portion or track is received, the hard disk aligns the head, via the arm, over the specific track location and the head writes the information to the disk.

Over the years, the disk and the head have undergone great reductions in their size. Much of the refinement has been driven by consumer demand for smaller and more portable hard drives such as those used in personal digital assistants (PDAs), Moving Picture Experts Group audio layer 3 (MP3) players, and the like. For example, the original hard disk drive had a disk diameter of 24 inches. Modern hard disk drives are much smaller and include disk diameters of less than 2.5 inches (micro drives are significantly smaller than that). Advances in magnetic recording density are also primary reasons for the reduction in size.

However, the increase of recording density requires decreased read and write track width and tight track width tolerance. It is becoming difficult to manufacture read and write heads to the tolerances required by today's small track sizes. When the write track width exceeds track pitch, erasure of adjacent tracks occurs. When the write track width is smaller than read width, the read head can easily pick track edge noise and interference data, data error rate degrades.

One solution to the problem is to use wider write heads, vary track and linear density, and write wide tracks that overlap each other, instead of tracks that are independent of each other. The track width is dependent on the offset between adjacent tracks at writing, not the write head track width. This gives the advantage of much relaxed tolerance requirement for the write head.

SUMMARY

A method and apparatus for optimizing data record quality on a disk for a pair of read and write heads, in which the write head is bigger, by adaptively varying linear and track density of overlapping recorded tracks to achieve a target storage capacity. In the method, target storage capacity and radial writing direction are selected. Read and write widths of heads are determined. A linear density and offset distance pairing for optimizing record quality at target storage capacity is determined, wherein offset distance is less than write width but greater than read width. The write head writes a track at the linear density, is offset in the radial direction by the offset distance, and the offset distance is stored. The write head writes a new track at the linear density. Offsetting, storing offset, and writing a new track are repeated until desired data is written into a cluster.

BEST MODES FOR CARRYING OUT THE INVENTION

Reference will now be made in detail to the alternative embodiment(s) of the present invention, a method and apparatus for optimizing record quality with varying track and linear density by allowing overlapping data tracks. While the invention will be described in conjunction with the alternative embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

The discussion will begin with an overview of the operation a hard disk drive and components connected therewith, then proceed into a discussion of the operation of write heads and read heads in conjunction with the hard disk drive. For purposes of clarity, portions of the overview embodiment will describe the operation of the read head and the operation of the write head separately. It should be understood that even though the read and write heads are being described as separate components, in practice they are often fabricated as single device that performs the two separate functions of reading and writing data. The discussion will then focus on embodiments of a method for optimizing record quality by varying track and linear density to achieve a target storage capacity.

Figure 1:
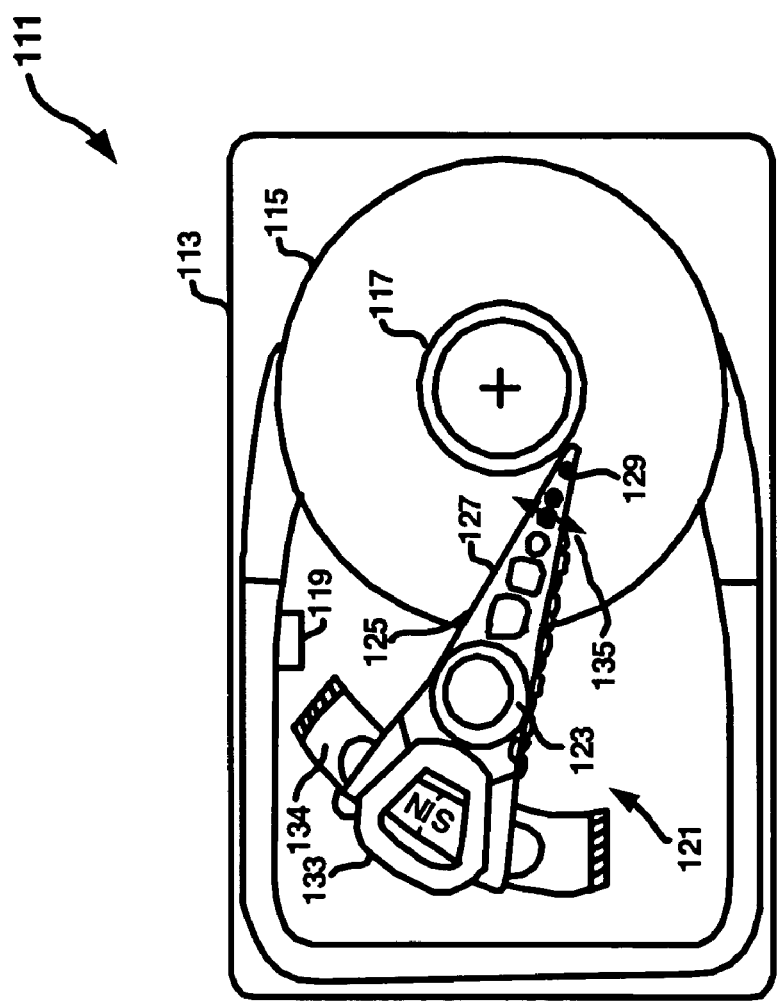
FIG. 1 is a schematic top plan view of a hard disk drive, in accordance with one embodiment of the present invention.

With reference now to FIG. 1, a schematic drawing of one embodiment of an information storage system comprising a magnetic hard disk file or drive 111 for a computer system is shown. Drive 111 has an outer housing or base 113 containing a disk pack having at least one media or magnetic disk 115. A spindle motor assembly having a central drive hub 117 rotates the disk or disks 115. An actuator 121 comprises a plurality of parallel actuator arms 125 (one shown) in the form of a comb that is movably or pivotally mounted to base 113 about a pivot assembly 123. A controller 119 is also mounted to base 113 for selectively moving the comb of arms 125 relative to disk 115.

In the embodiment shown, each arm 125 has extending from it at least one cantilevered electrical lead suspension (ELS) 129. The ELS may be any form of lead suspension that can be used in a Data Access Storage Device, such as a HDD. A magnetic read/write transducer or head is mounted on a slider and secured to a flexure that is flexibly mounted to each suspension 129. The read/write heads magnetically read data from and/or magnetically write data to disk 115. The level of integration called the head gimbal assembly is the head and the slider 230 (see FIG. 2), which are mounted on suspension 127. The slider 230 (see FIG. 2) is usually bonded to the end of ELS 129.

ELS 129 has a spring-like quality, which biases or presses the air-bearing surface of the slider 230 (see FIG. 2) against the disk 115 to cause the slider 230 (see FIG. 2) to fly at a precise distance from the disk 115. ELS 129 has a hinge area that provides for the spring-like quality, and a flexing interconnect that supports read and write traces through the hinge area. A voice coil 133, free to move within a conventional voice coil motor magnet assembly 134 (top pole not shown), is also mounted to arms 125 opposite the head gimbal assemblies. Movement of the actuator 121 (indicated by arrow 135) by controller 119 causes the head gimbal assemblies to move along radial arcs across tracks on the disk 115 until the heads settle on their set target tracks. The head gimbal assemblies operate in a conventional manner and always move in unison with one another, unless drive 111 uses multiple independent actuators (not shown) wherein the arms can move independently of one another.

Figure 2:
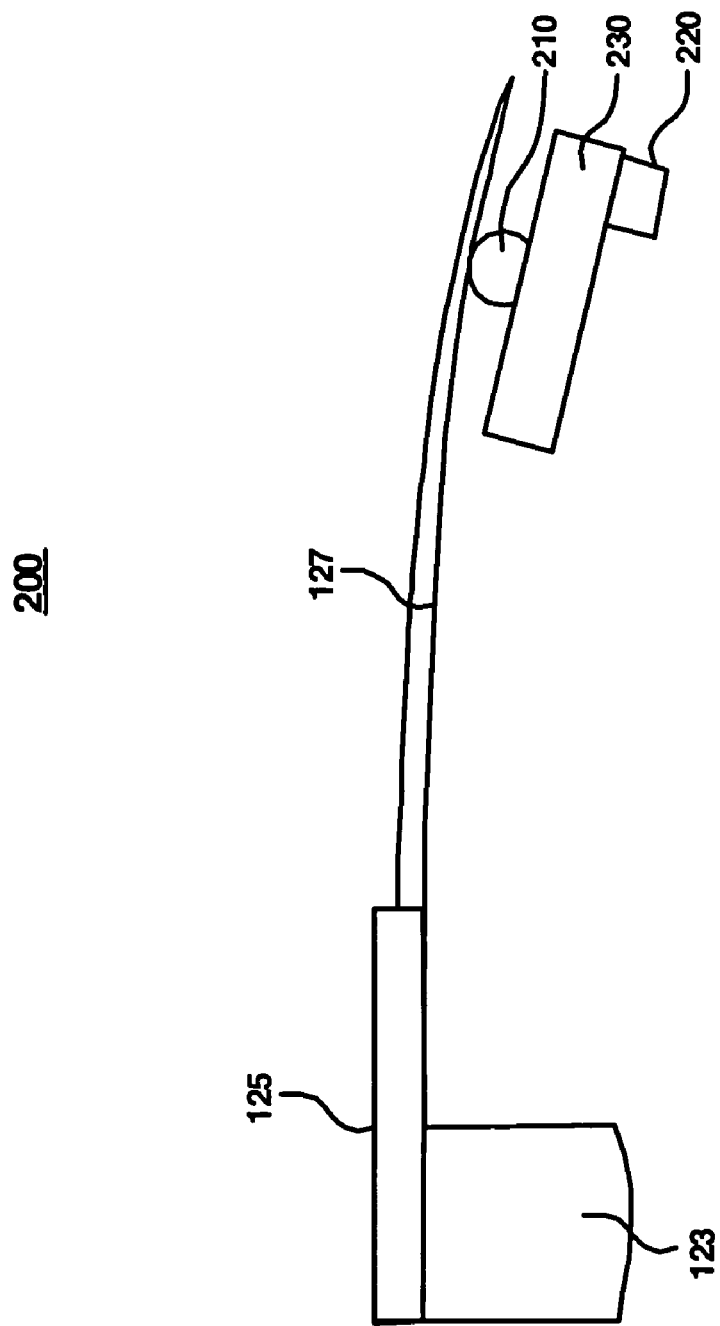
FIG. 2 is a side view of an exemplary actuator with a read/write head from a hard disk drive, in accordance with one embodiment of this invention.

Referring now to FIG. 2, a side view of an exemplary actuator 200 with a read/write head 220 from a hard disk drive 111 (shown in FIG. 1), in accordance with one embodiment of the present invention is shown. The actuator arm 125 has extending from it at least one suspension 127 with at least one ELS 129 (shown in FIG. 1). A magnetic read/write transducer or head 220 is mounted on a slider 230 and secured via a gimbal 210 that is coupled to each ELS 129 (shown in FIG. 1). The actuator arm 125, is attached to a pivot assembly 123.

Figure 3:
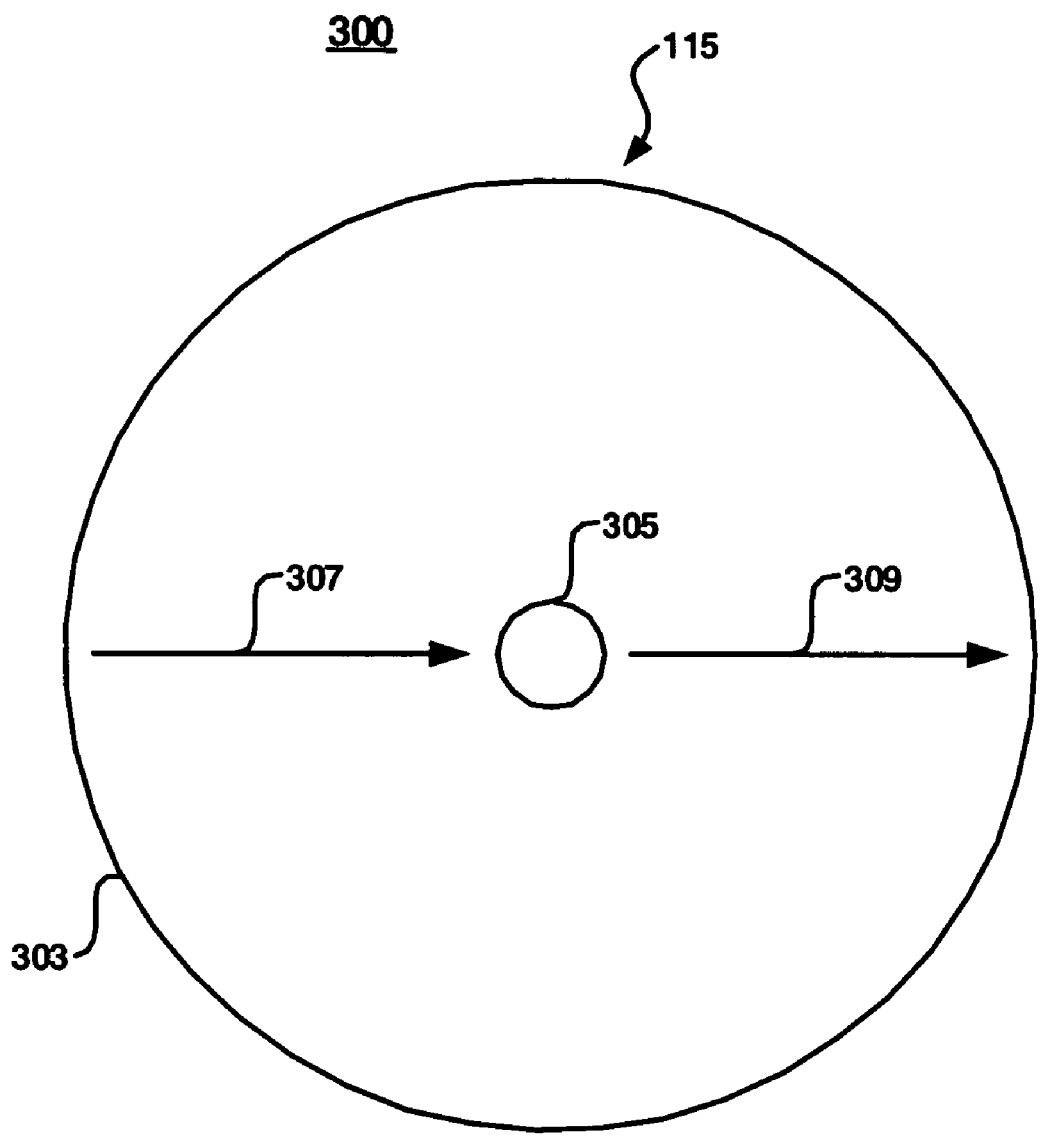
FIG. 3 is a top plan view of an exemplary magnetic disk showing the radial writing direction(s), in accordance with one embodiment of this invention.

Referring now to FIG. 3, a top plan view of an exemplary magnetic disk 115 showing the radial writing direction(s), in accordance with one embodiment of this invention is shown. The disk 115 has an outer diameter 303 and an inner diameter 305. The head 220, of FIG. 2, is moved across the disk 115 to write and read data. The radial direction from the outer diameter 303 to the inner diameter 305 is shown by arrow 307. The radial direction from the inner diameter 305 to the outer diameter 303 is shown by arrow 309. In the embodiments of the present invention in which overlapping data tracks are written, the data can be written in a radial direction 307 from the outer diameter 303 to inner diameter 305. The data can also be written in a radial direction 309 from the inner diameter 305 to the outer diameter 303.

Figure 4:
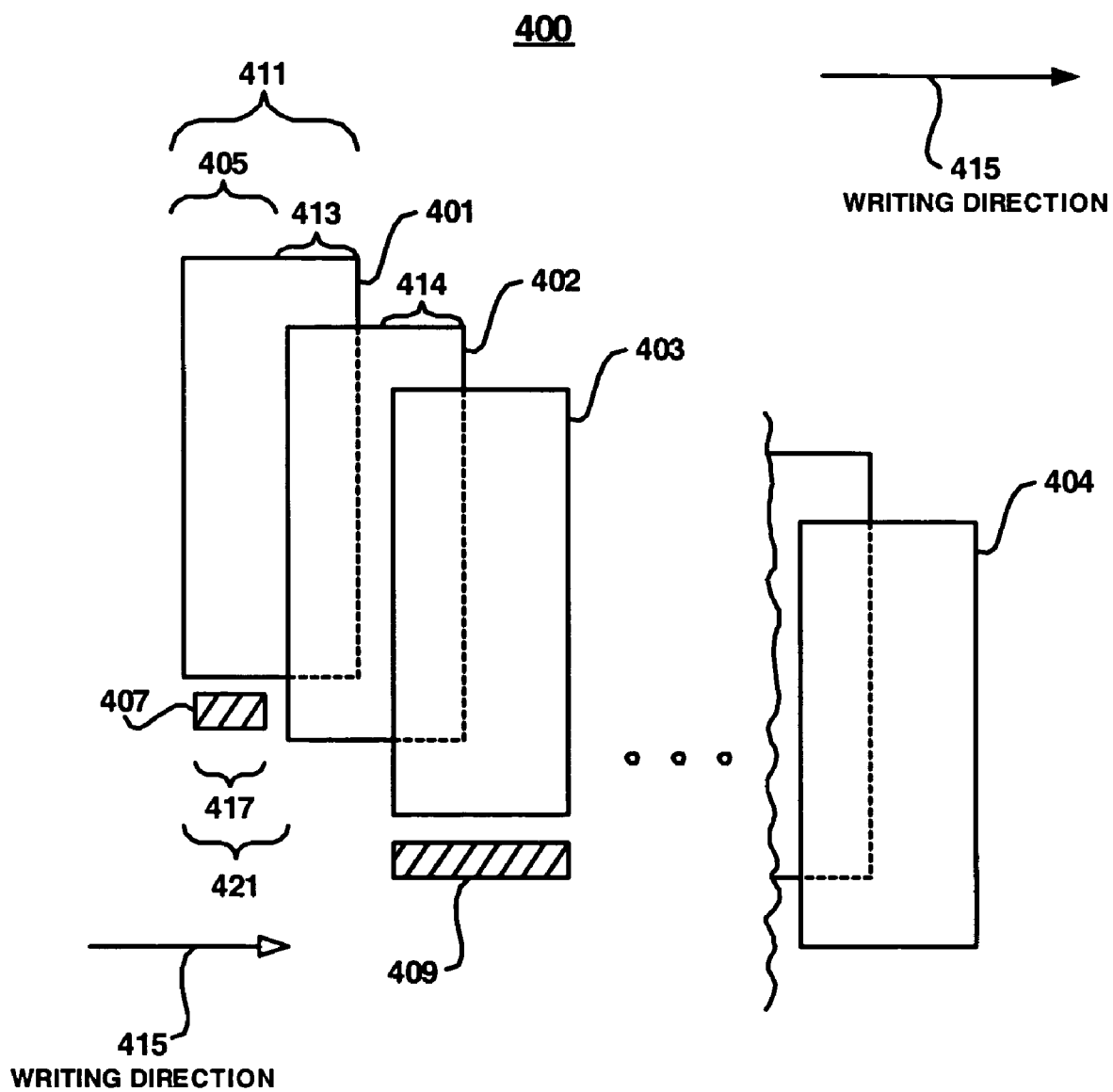
FIG. 4 is a magnified example of a read head and write head along with a cluster of overlapping data tracks in accordance with one embodiment of the present invention.

Referring now to FIG. 4, a magnified example of a read head 407 and write head 409 along with a cluster of overlapping data tracks 400 in accordance with one embodiment of the present invention is shown. An exemplary write head 409 is shown in relation to a track that it has written 403. In the example the write head 409 is shown at the same width as the data track, this does not preclude a write head 409, in accordance with embodiments of the present invention, from being bigger or smaller than the written data track that it writes. Due to the small nature of write heads 409 and the difficulties of manufacture, actual performance of write heads can vary widely from designed tolerances. Embodiments of the present invention are meant to work with write heads that have a wide variety of write widths 411.

FIG. 4 also shows a read head 407 relative to the non-overwritten portion 421 of the first data track 401. Though the read head 407 is shown as slightly smaller than the non-overwritten portion 421 of the first data track 401, this should not be viewed as a requirement for any embodiment of this invention. The embodiments of this invention are operable with a variety of read head 407 sizes so long as the effective read width 417, which can be bigger or smaller than the width of the read head 407, is narrower than the non-overwritten portion of the data track it is reading.

FIG. 4 shows an example of how data can be written in overlapping tracks 400 in accordance with some embodiments of this invention. In this magnified Figure and the Figures that follow, the data tracks are shown as short straight lines. It should be understood that the actual data tracks are much smaller and when viewed with less magnification would in be long circular lines that go around the surface of the disk 115, shown in FIG. 1, in concentric circles.

In FIG. 4, a first data track 401 is written. The write head 409 is then offset in a selected direction 415 by an offset distance 405. The offset distance 405 will determine not only how far the write head 409 is moved, but also how much of the track is not overwritten 421. In the embodiments of this invention containing overwritten data tracks, the offset distance 405 is equal in width to the non-overwritten area 421 of the data track. This non-overwritten area 421 is the portion of the data track that is readable by the read head 407.

In FIG. 4, after the write head 409 is offset, a second data track 402 is written which partially overlaps and therefore partially overwrites the first data track 401. The sections shown by dotted lines on the second track 402 represent overwritten area 413 of the first track 401. The width of the overlap 413 can be calculated as [write width–offset distance]. The write head 409 is then offset again in the selected direction 415 and a third data track 403 is written that overlaps the second data track 402 by a small distance 414 equal to [write width–offset distance]. This process is repeated until all desired data is written into a cluster of these overlapping tracks 400. In FIG. 4, the Nth track 404 represents the last track of data written into this exemplary cluster 400 of overlapping tracks.

Figure 5:
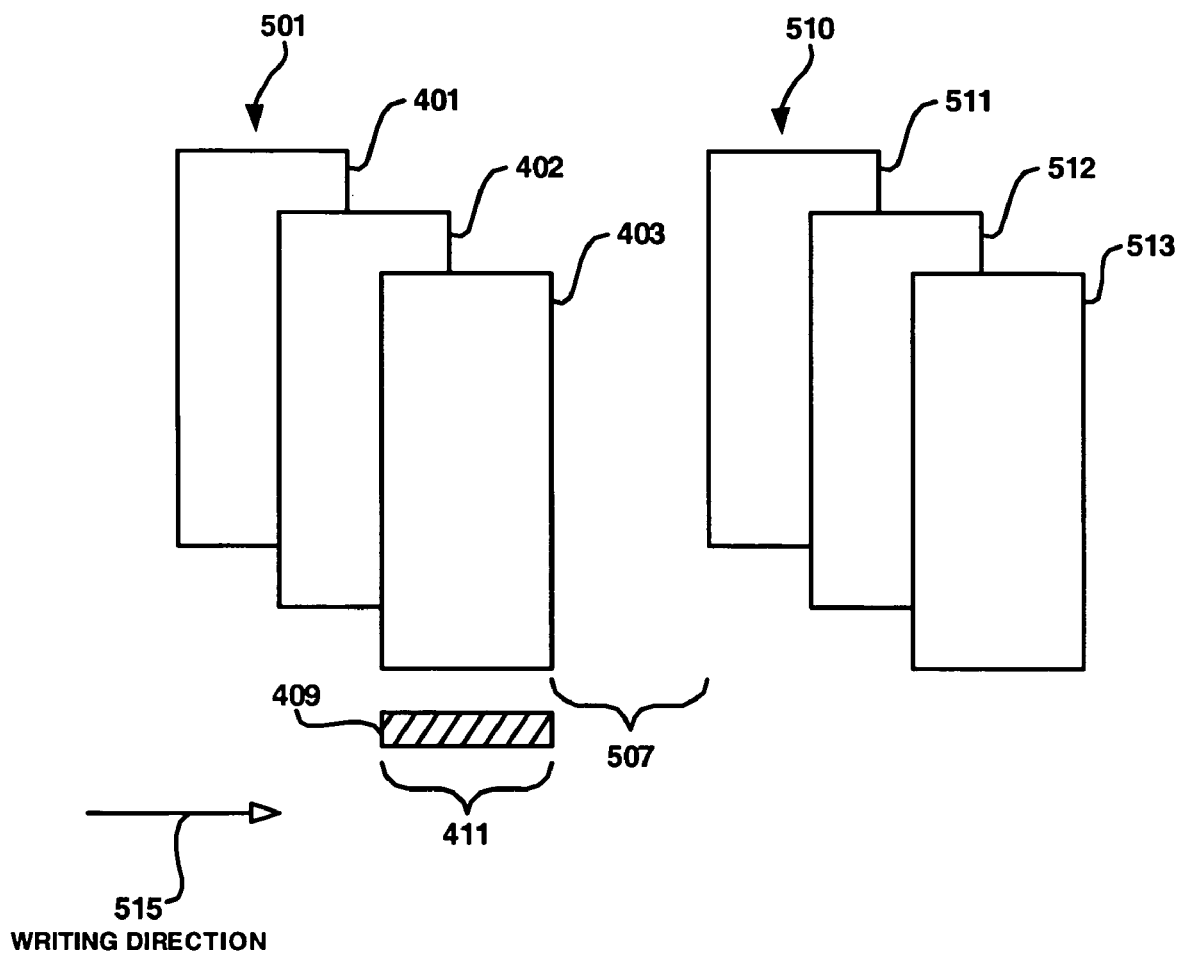
FIG. 5 is a magnified example of side-by-side clusters of overlapping data tracks in accordance with one embodiment of the present invention.

FIG. 5 is a magnified example of side-by-side clusters 500 of overlapping data tracks in accordance with one embodiment of the present invention. In the first exemplary cluster 501 there is a first written track 401, a second written track 402 that partially overwrites the first track 401, and a third written track 403 that partially overwrites the second track 402. There is then a second exemplary cluster 510 of overlapping data tracks containing a first written track 511, a second written track 512 that partially overwrites the first track 511, and a third written track 513 that partially overwrites the second written track 512. This second cluster 510 is written in the same overlapping manner as the first cluster 501. These tracks are written in the same manner as the overlapping data tracks in FIG. 4. The tracks in clusters 501 and 510 are written with a write head 409 that has a write width 411 as shown. The arrow 515 shows the direction of writing for the overlapping tracks.

The first cluster 501 and second cluster 510 are separated by a space, or guard band 507, that is slightly greater in width than the write width 411 of the write head 409. The purpose of the guard band 507 is to prevent the data in the last track 403 of the first cluster 501 from being overwritten by the first track 511 of the second cluster 510. In the example only three tracks have been shown in each exemplary cluster. It should be understood that clusters can contain fewer tracks, but will likely contain more tracks. For efficient use of surface area on a disk, such as disk 115 in FIG. 1, overlapping clusters of one hundred tracks or more are preferred. Further, FIG. 5 is not intended to indicate that this embodiment is limited to two clusters of data tracks. It should be understood that this embodiment can contain a plurality of clusters, each separated from the next cluster by a guard band as show.

Figure 6:
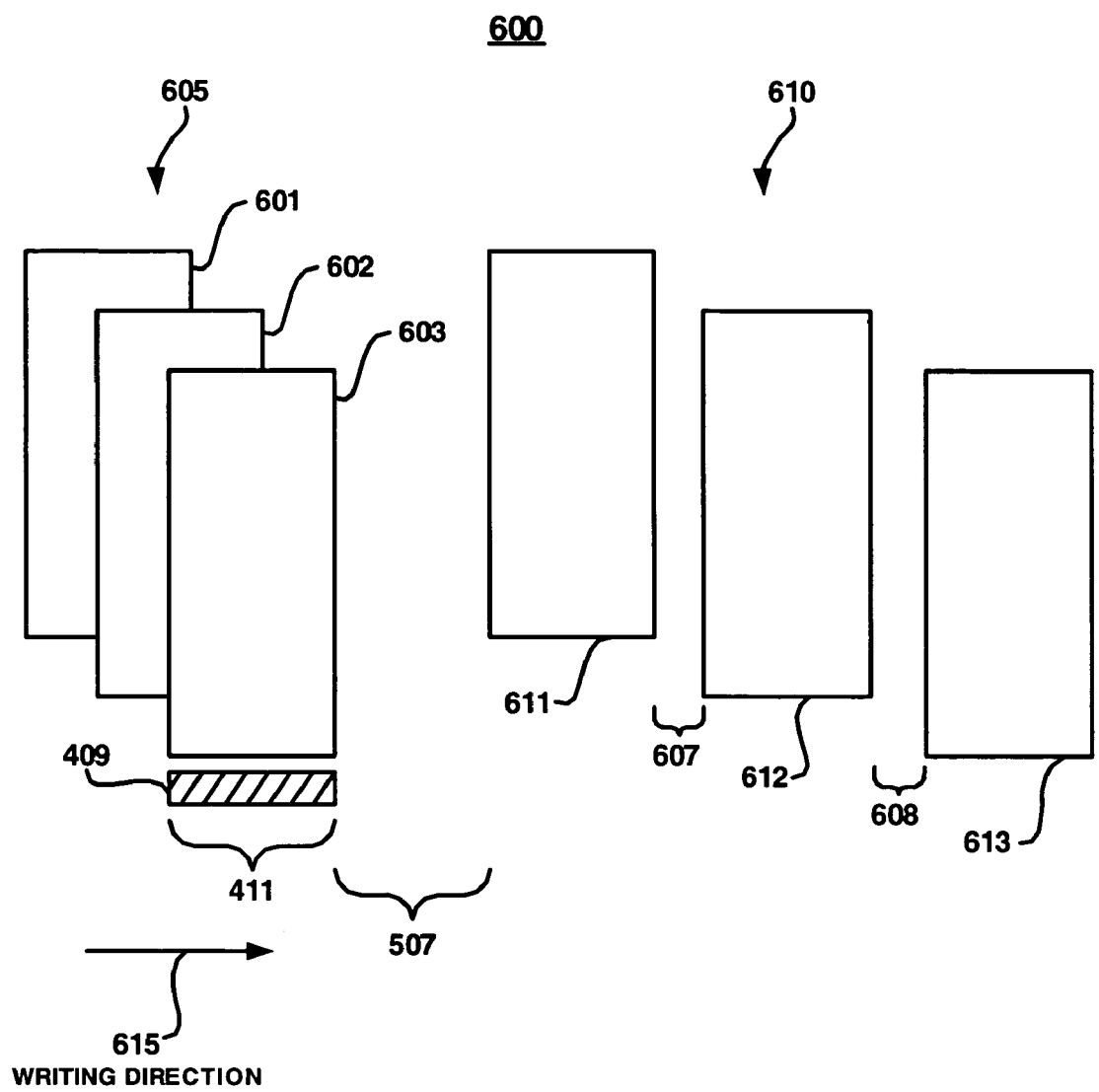
FIG. 6 is a magnified example of side-by-side clusters of overlapping and non-overlapping data tracks in accordance with one embodiment of the present invention.

Referring now to FIG. 6, a magnified example of side-by-side clusters 600 of overlapping and non-overlapping data tracks in accordance with one embodiment of the present invention is shown. The tracks in clusters 605 and 610 are written with a write head 409 that has a write width 411 as shown. The arrow 615 shows the direction of writing for the cluster of overlapping data tracks 605. The direction of writing 615 could also be used with the non-overlapping cluster of data tracks 610, but that is not required for embodiments of this invention.

Referring to FIG. 6, in the first exemplary cluster of overlapping data tracks 605 there is a first written track 601, a second written track 602 that partially overwrites the first track 601, and a third written track 603 that partially overwrites the second track 602. The tracks in this cluster 605 are written in the same manner as the overlapping data tracks 400 in FIG. 4, even though they are shown as being more tightly spaced. There is then a second exemplary cluster of non-overlapping data tracks 610 containing a first written track 611, a second written track 612 separated by a space 607 from the first data track 611, and a third written track 613 separated from the second written track 612 by a space 608 equivalent to the first space 607. The second cluster 610 is separated from the first cluster 605 by a guard band 507. This second cluster 610 is written in a more traditional manner with non-overlapping data tracks, which allows the tracks to be written in a non-sequential manner. The labels of first, second, and third track are used for convenience here, and are not meant to indicate that the tracks in the non-overlapping data cluster need to be written in any particular order.

In FIG. 6, the first cluster 605 and second cluster 610 are separated by a space, or guard band 507, that is slightly wider in width than the write width 411 of the write head 409. The purpose of the guard band 507 is to prevent the data in the last track 603 of the first cluster 605 from being overwritten by the first track 611 of the second cluster 610. In the example only three tracks have been shown in each exemplary cluster. It should be understood that clusters can contain fewer tracks, but will likely contain more tracks. Further, FIG. 6 is not intended to indicate that this embodiment is limited to two clusters of data tracks. It should be understood that this embodiment can contain a plurality of clusters of overlapping tracks and a plurality of clusters of non-overlapping tracks, each cluster separated from the next cluster by a guard band 507 as show.

FIG. 6, demonstrates the advantage of writing some, or all clusters of data with overlapping tracks. Spaces between tracks can be reduced or eliminated. This gives the ability to compensate for out of tolerance heads by manipulating the linear density and track density to prevent sacrificing the targeted storage capacity (or areal density).

Figure 7:
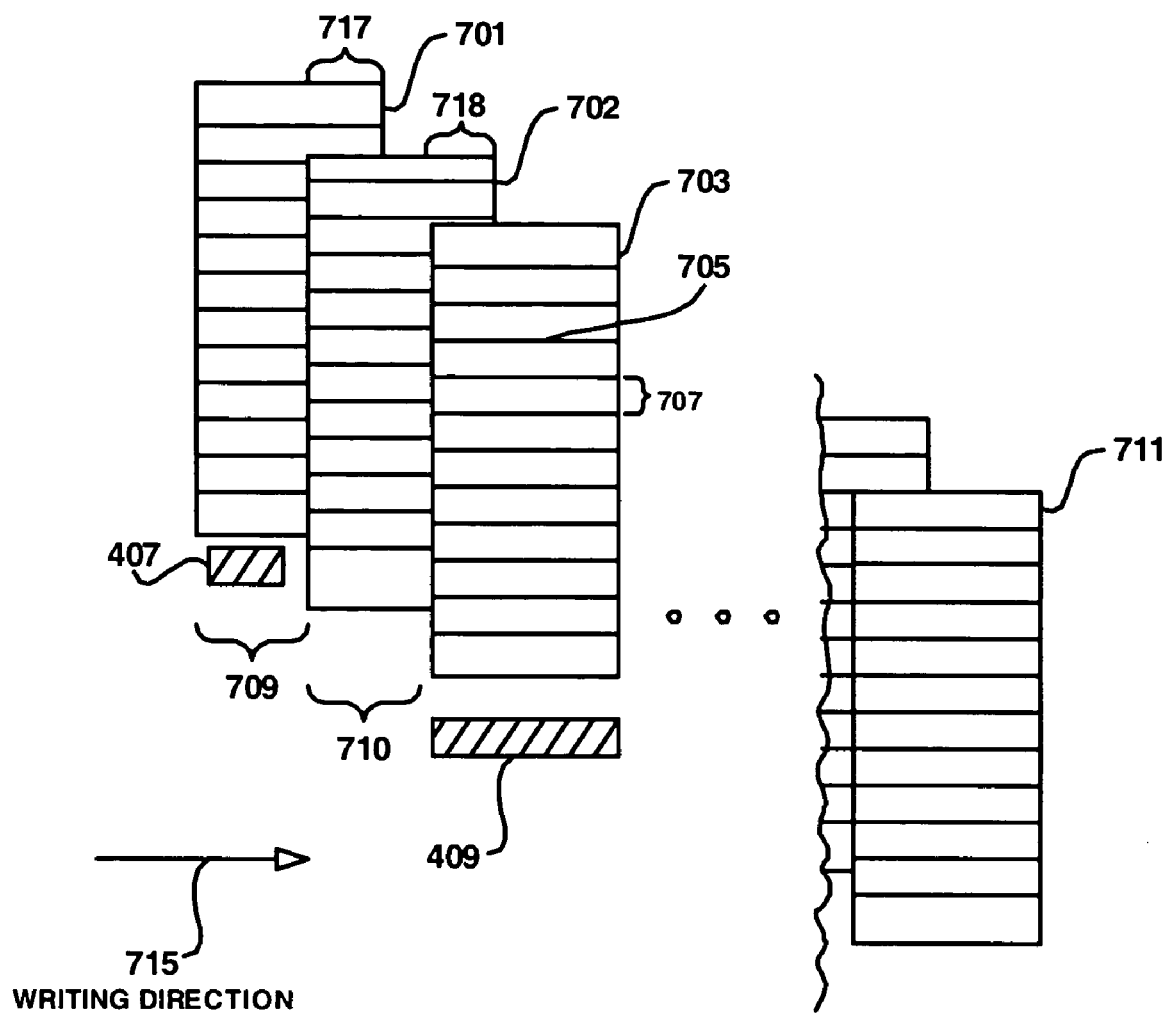
FIG. 7 is a magnified example of a cluster of overlapping data tracks written with a low track density and a high linear density in accordance with one embodiment of the present invention.

Referring now to FIG. 7, a magnified example of a cluster 700 of overlapping data tracks written with a low track density and a high linear density in accordance with one embodiment of the present invention is shown. A first data track 701 is written. The linear density of this first data track 701 is high, as represented by the many bits 705 of data with only small spaces 707 between them. The write head 409 is shifted in a selected direction 715 by a wide offset 709. A second data track 702 is written that slightly overlaps 717 the first track 701. This second track 702 is also written at a high linear density. The write head 409 is shifted again in the selected direction 715 by a wide offset 710. A third data track 703 is written that overlaps the second data track 702 by an overlap distance 718 equal to the previous overlap 717. The third track 703 is also written at a high linear density. This process is repeated until all desired data is written into the cluster. The last data track of this cluster is represented by the Nth track 711.

FIG. 7 shows how tracks can be overlapped a slight distance 717 and written at a high linear density. In one embodiment, this combination of high linear density and lower track density is selected to achieve a target storage capacity (or areal density) in many situations. The example shown in FIG. 7 can be useful in a situation where the read head 407, write head 409, or both are manufactured slightly out of design tolerance. As a specific example, it is useful in a situation where the write head 409 is not capable of writing narrower tracks, and a target storage capacity (or areal density) cannot be met by writing only non-overlapping tracks with spaces between the tracks. Some, or all clusters on a disk, such as disk 115 in FIG. 1, can be written as shown in FIG. 7 to enable meeting the designed storage capacity (or areal density), even with a head (or heads) slightly out of design tolerance.

Figure 8:
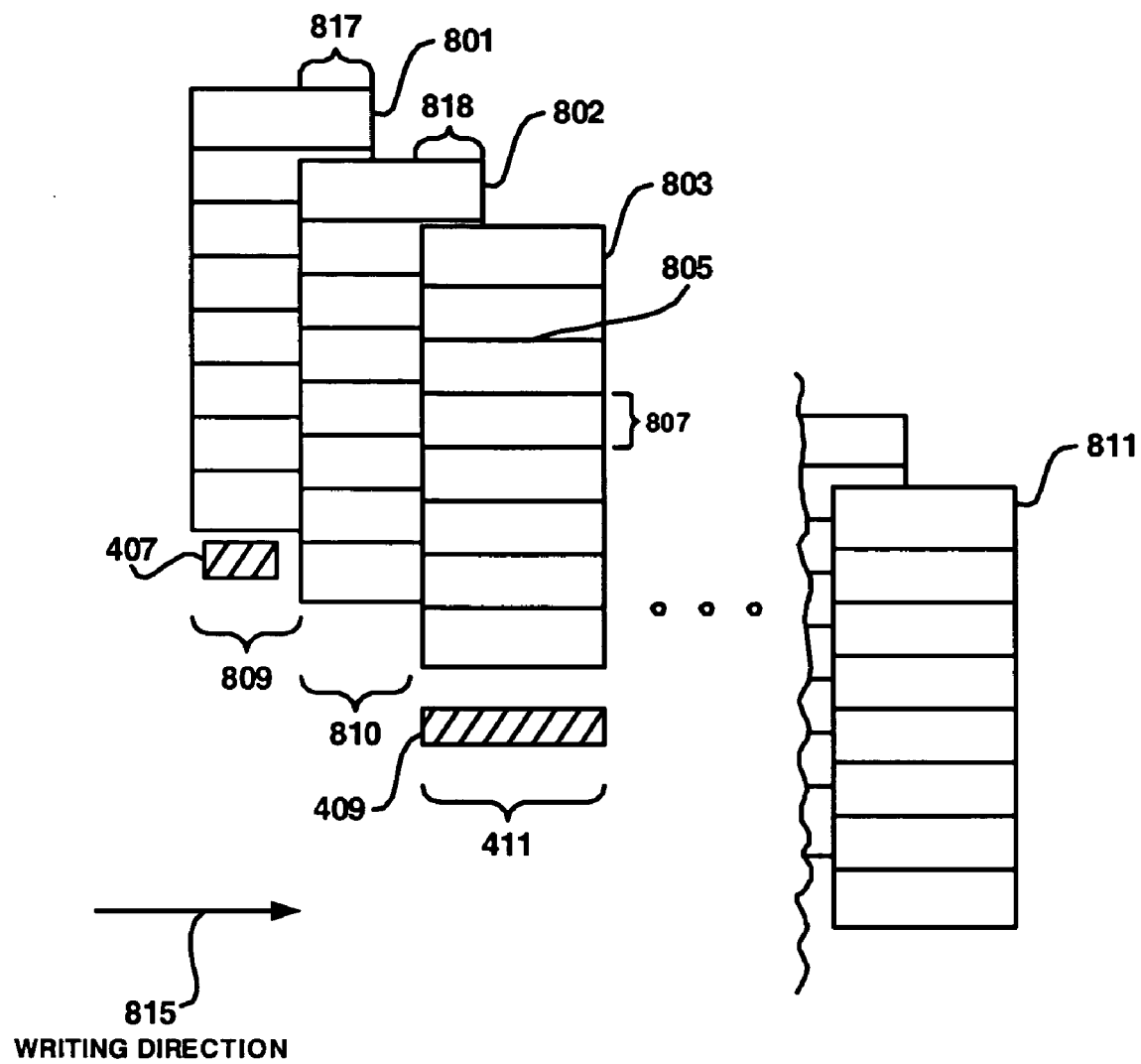
FIG. 8 is a magnified example of a cluster of overlapping data tracks written with a medium track density and a medium linear density in accordance with one embodiment of the present invention.

Referring now to FIG. 8, a magnified example of a cluster 800 of overlapping data tracks written with a medium track density and a medium linear density in accordance with one embodiment of the present invention is shown. A first data track 801 is written. The linear density of this first track 801 is medium as compared to that of FIG. 7 and FIG. 9, and as represented by the bits 805 of data with wider spaces 807 between them than the spaces in FIG. 7. The write head 409 is shifted in a selected direction 815 by a medium offset distance 809, as compared to FIG. 7 and FIG. 9. A second data track 802 is written that overlaps 817 the first track 801. This second track 802 is also written at a medium linear density. The write head 409 is shifted again in the selected direction 815 by a medium offset distance 810. A third data track 803 is written that overlaps the second track 802 by an overlap 818 equal to the previous overlap distance 817. The third track 803 is also written at a medium linear density. This process is repeated until all desired data is written into the cluster 800. The last data track of this cluster 800 is represented by the Nth track 811.

FIG. 8 shows how tracks can be overlapped a medium distance 817, and written at a medium linear density. In one embodiment, this combination of medium linear density and medium track density is selected to achieve a target storage capacity (or areal density) in many situations. The example shown in FIG. 8 can be useful in a situation where the read head 407, write head 409, or both are manufactured slightly out of design tolerance. As a specific example, it is useful in a situation where the write width 411 of the write head 409 is within design specification, but it cannot write up to the designed linear density. This could prevent the drive from meeting its target storage capacity (or areal density) if only non-overlapping tracks with spaces between the tracks were written. Some, or all clusters on a disk, such as disk 115 in FIG. 1, can be written as shown in FIG. 8 to enable the linear density to be relaxed to a level the write head can operate at. The space saved by writing some or all of the clusters with overlapping tracks allows for meeting the designed storage capacity (or areal density), even with a head (or heads) slightly out of design tolerance.

Figure 9:
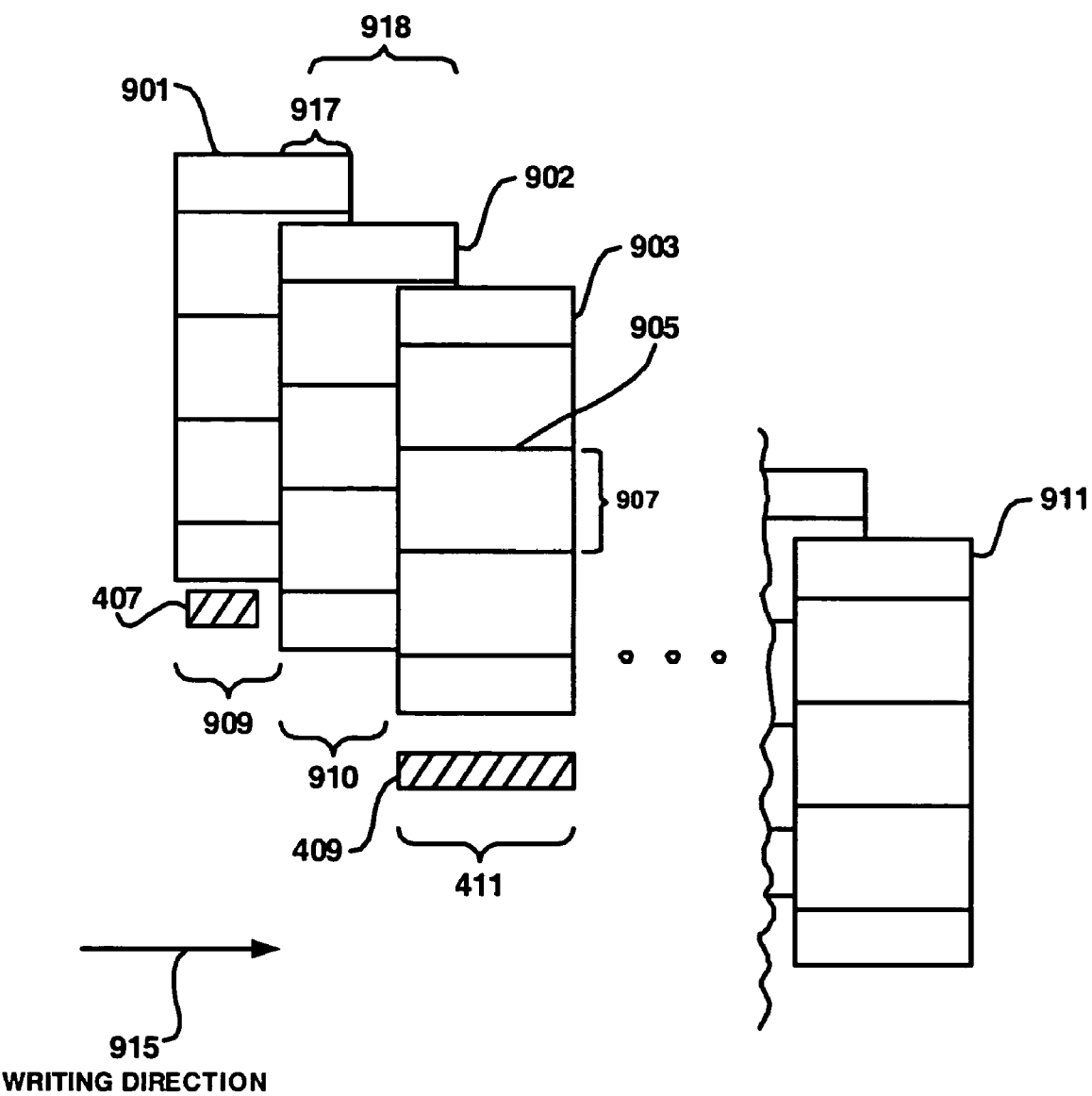
FIG. 9 is a magnified example of a cluster of overlapping data tracks written with a high track density and a low linear density in accordance with one embodiment of the present invention.

Referring now to FIG. 9, a magnified example of a cluster 900 of overlapping data tracks written with a high track density and a low linear density in accordance with one embodiment of the present invention is shown. A first data track 901 is written. The linear density of this first track 901 is low as compared to that of FIG. 7 and FIG. 8, and as represented by the bits 905 of data with very wide spaces 907 between them. The write head 409 is shifted in a selected direction 915 by a narrow offset distance 909, as compared to FIG. 7 and FIG. 9. A second data track 902 is written that greatly overlaps 917 the first track 901. This second track 902 is also written at a low linear density. The write head 409 is shifted again in the selected direction 915 by a narrow distance 910. A third data track 903 is written that overlaps the second track 902 by an overlap distance 918 equal to the previous overlap distance 917. The third track 903 is also written at a low linear density. This process is repeated until all desired data is written into the cluster 900. The last data track of this cluster 900 is represented by the Nth track 911.

FIG. 9 shows how tracks can be overlapped a wide distance 917, and written at a low linear density. In one embodiment, this combination of low linear density and high track density is selected to achieve a target storage capacity (or areal density) in many situations. The example shown in FIG. 9 can be useful in a situation where the read head 407, write head 409, or both are manufactured out of design tolerance. As a specific example, it is useful in a situation where the write width 411 of the write head 409 is significantly wider than the design specification. This could prevent the drive from meeting its target storage capacity (or areal density) if only non-overlapping tracks with spaces between the tracks were written. Some, or all clusters on a disk, such as disk 115 in FIG. 1, can be written as shown in FIG. 9 to enable meeting the designed storage capacity (or areal density), even with a head (or heads) out of design tolerance.

While the examples provided in FIG. 7, FIG. 8, and FIG. 9 are specific, the present invention is suitable to alternative embodiments. For example, the method of the present invention is applicable to embodiments ranging from recording at low track density and low linear density, to embodiments recording at high track density and high linear density. Likewise, for simplicity of example, track density and linear density were shown at only three gradients of low, medium, and high. Embodiments of the present invention are suitable to other gradients as required by the particulars of a set of read and write heads and as required by the target storage capacity.

The embodiments of this invention are useful in many situations. In one embodiment, a disk drive maker can manufacture identical disks with an initial target disk capacity of 10 Gigabytes of data. The manufacturer can then utilize the methods described to format these disks in various capacities of, for example, 1, 5, 7, 10, and 15 Gigabytes, in response to consumer demand for different storage capacities. Instead of just having traditional non-overlapping tracks, drives can be produced with a plurality of different formats containing exclusively overlapping tracks, or a combination of overlapping tracks and non-overlapping tracks. Drives with exclusively or mostly overlapping tracks can be customized to store movies or video segments of various lengths without going to the expense of designing and manufacturing the drives specifically for the size and function needed by a particular application. A flexible and varied product line is offered without additional design and manufacturing expenses, and inventory and production are streamlined because of uniform disk size.

In another embodiment, the storage capacity of a disk can be partially decoupled from the read and write heads designed for use with it. Fluctuations in the tolerances of read and write heads occur in production runs. It is common to find that many write heads in a production run will write a track width that is 50% wider or narrower than the design specification for the disks and drives they are designed to be used with. It is also common to find similar fluctuations in the actual read widths of read heads within production runs. Normally these read and write heads that are out of tolerance are disposed of as useless. However, utilizing the methods described, many out of tolerance heads can be used instead of being disposed of.

For instance, by writing overlapping data tracks, write width is decoupled from track width. Track width is determined instead by how far the write head is offset before the next track is written (partially on top of the previous track). This means narrow data tracks can be produced with write heads that write wide tracks. When narrower tracks are written than the disk and head design specifications call for, either with a narrower writing head or with narrow tracks created by overlapping, linear density can be relaxed and a target storage capacity can still be met. Conversely, if narrower tracks are written than the design specification calls for, and linear density is not relaxed, or is instead increased, the result is increased storage capacity in the area of the disk where the overlapping tracks are written. The capability to utilize write heads that would have previously been discarded for being out of tolerance translates into cost savings through increased manufacturing efficiency.

Writing overlapping tracks also allows for taking advantage of a read head that is capable of reading a narrower track that it was designed to read. Written track width can be tailored to the capability of the read head. This will allow the target storage capacity to be realized with a relaxed linear density. Further, if the linear density is instead maintained or increased, a greater target storage capacity can be achieved. If the read head is out of tolerance such that it can only read tracks wider than the design specification, then linear density can be increased to achieve the target storage capacity while utilizing the out of tolerance read head. The capability to use read heads that read both wider and narrower tracks than called for in the manufacturing specification means that many read heads can be used that would previously have been discarded as being out of tolerance. This translates into cost savings through improved manufacturing efficiency.

In another embodiment, the drive tests the actual performance of the read and write heads, then using the methods described, stores data on the drive in a manner that optimizes storage capacity for the particular combination of heads and disks being used. Drives formatted in this manner would likely be very useful for data backup, or for storage of video, music, or other long and mostly sequentially writable data steams.

Figure 10:
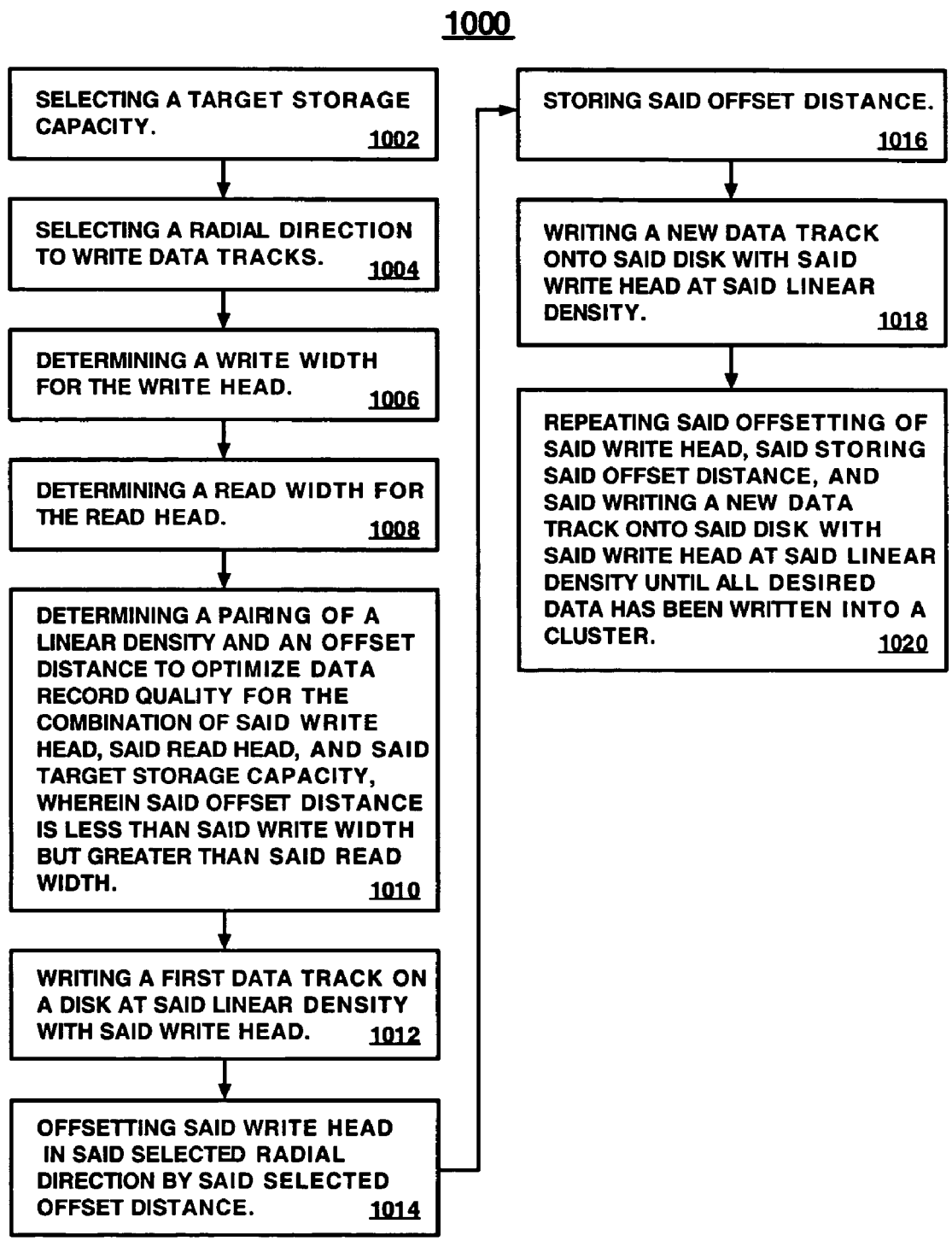
FIG. 10 is a flowchart of a method for optimizing record quality by varying track and linear density to achieve a target storage capacity in accordance with one embodiment of the present invention.

Referring now to FIG. 10, a flowchart 1000 of a method for optimizing record quality by varying track and linear density to achieve a target storage capacity in accordance with one embodiment of the present invention is shown.

With reference now to block 1002 of FIG. 10 and to FIG. 1, one embodiment provides selecting a target storage capacity. In this block, a target storage capacity for some portion or for the entirety of disk 115 is selected.

With reference now to block 1004 of FIG. 10 and to FIG. 3, one embodiment provides selecting a radial direction (307 or 309) to write data tracks. Overlapping data tracks are written in sequential order, either in a radial direction 307 from the outer diameter 303 toward the inner diameter 305 of the disk 115 or in a radial direction 309 from the inner diameter 305 toward the outer diameter 303 of the disk 115.

With reference now to block 1006 of FIG. 10 and to FIG. 4, one embodiment provides for determining a write width 411 for the write head 409. The write head 409 is tested to determine the width of track 411 that it writes.

With reference now to block 1008 of FIG. 10 and to FIG. 4, one embodiment provides for determining a read width 417 for the read head 407. The read head 407 is tested to determine the smallest width of a data track it can read.

With reference now to block 1010 of FIG. 10 and to FIG. 4, one embodiment provides for determining a pairing of a linear density and an offset distance to optimize data record quality for the combination of said write head 409, said read head 407, and said target storage capacity. Given a known write width 411, read width 417, and target storage capacity (or areal density), the linear density (spacing of bits on a track) and offset 405 (which determines effective width of written tracks) can be selected utilizing the equation [area density=(linear density)(track density)] to allow the combination of read and write heads to meet the target storage capacity. There are some limitations. For instance, the linear density cannot exceed the capabilities of the read or write head. The read width 417 must always be smaller than the un-overwritten portion 421 of the data tracks. Additionally, the offset distance 405 must be smaller than the write width 411, if it is desired to have overlapping data tracks.

With reference now to block 1012 of FIG. 10 and to FIG. 4, one embodiment provides for writing a first data track 401 on a disk (such as disk 115 in FIG. 1) at said linear density with said write head 409. In a cluster of overlapping tracks 400, this will be the first track 401 in a series of sequentially written data tracks.

With reference now to block 1014 of FIG. 10 and to FIG. 4, one embodiment provides for offsetting said write head in said selected radial direction 415 by said selected offset distance 405. This positions the write head properly to write the next track. It also determines how much of the track is left as readable, or un-overwritten 421. Because there is no spacing between the tracks, track pitch is equal to the offset distance 405.

With reference now to block 1016 of FIG. 10 and to FIG. 4, one embodiment provides for storing said offset distance 405. This facilitates location of the track(s) for future read back, as the read head 407 will be positioned over a track and/or offset from track to track to read data that is written.

With reference now to block 1018 of FIG. 10 and to FIG. 4, one embodiment provides for writing a new data track onto said disk (such as disk 115 in FIG. 1) with said write head 409 at said linear density. This provides for writing a second data track 402 that overlaps the first data track 401 by a distance 413 equal to [write width−offset distance].

With reference now to block 1020 of FIG. 10 and FIG. 4, one embodiment provides for repeating said offsetting of said write head 409, said storing said offset distance 405, and said writing a new data track onto said disk (such as disk 115 in FIG. 1) with said write head 409 at said linear density until all desired data has been written into a cluster 400. This block provides for writing a third data track 403 and any additional data tracks in a sequential manner, until all data is written into a cluster 400 of overlapping data tracks.

Referring now to FIG. 1, a flowchart 1100 of a method for optimizing record quality by varying track and linear density to achieve a target storage capacity with clusters of overlapping data tracks in accordance with one embodiment of the present invention is shown.

Figure 11:
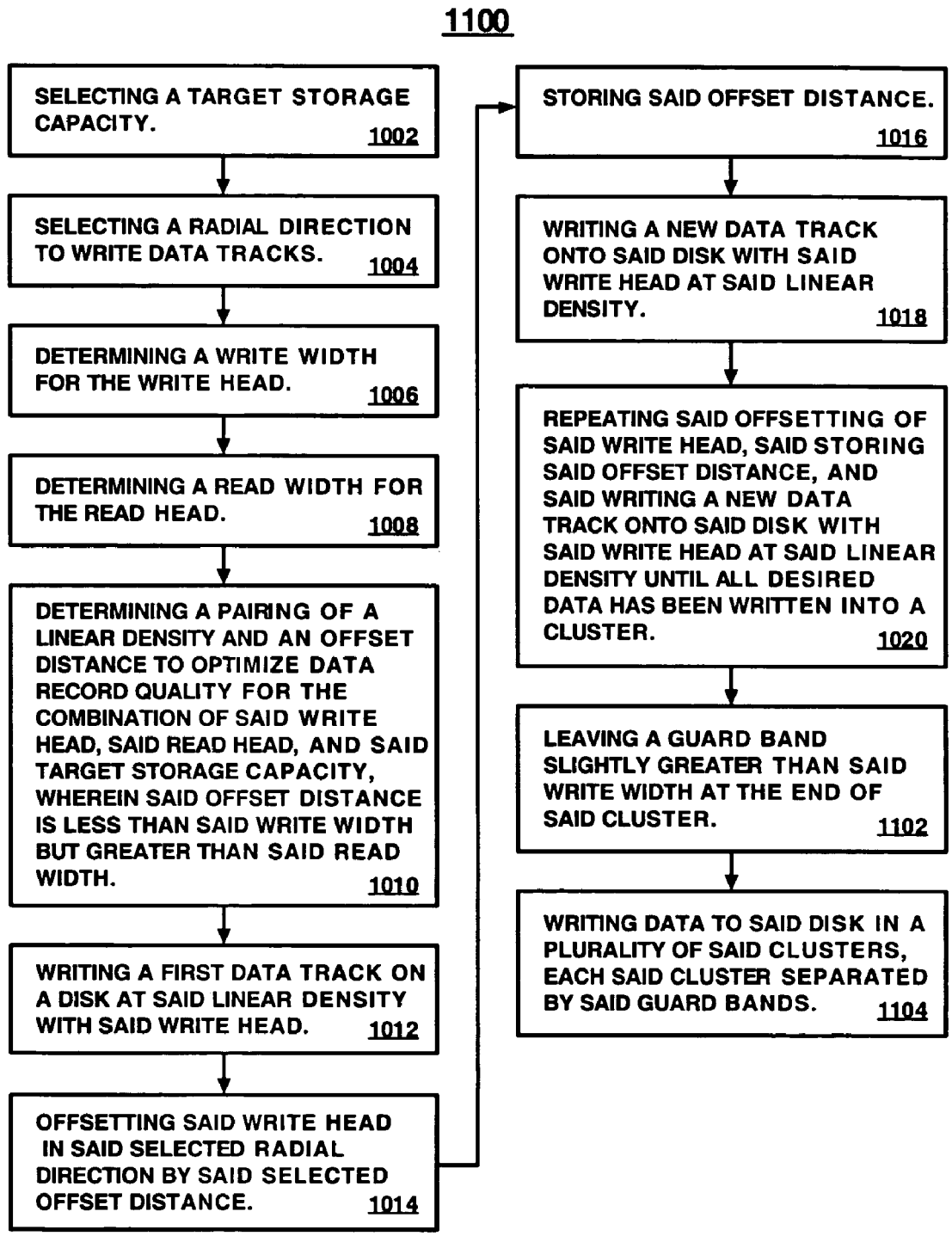
FIG. 11 is a flowchart of a method for optimizing record quality by varying track and linear density to achieve a target storage capacity with clusters of overlapping data tracks in accordance with one embodiment of the present invention.

With reference now to blocks 1002 through 1020 of FIG. 11, these blocks are the same as previously described in FIG. 10.

With reference now to block 1102 of FIG. 11 and to FIG. 5, one embodiment provides for leaving a guard band 507 slightly greater than said write width 411 at the end of said cluster 501. This is done to prevent overwriting the last track 403 of a cluster of data tracks 501 with the first track 511 of the next cluster of data tracks 510.

With reference now to block 1104 of FIG. 11 and to FIG. 5, one embodiment provides for writing data to said disk (such as disk 115 in FIG. 1) in a plurality of said clusters 500, each said cluster separated by said guard bands 507. This can be useful if writing two or more clusters of sequentially written data. Music files and video files are some examples of such sequentially written data.

Figure 12:
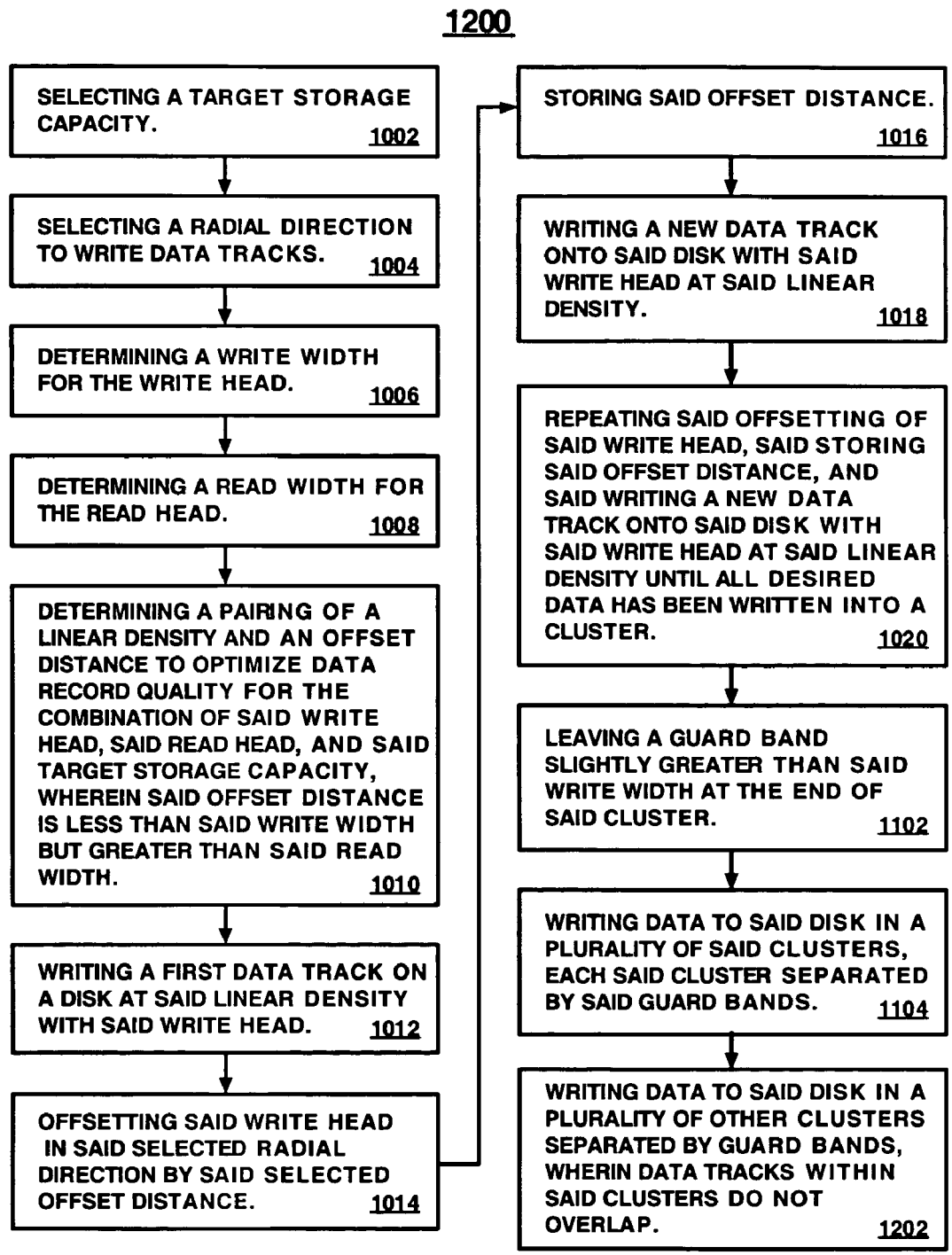
FIG. 12 is a flowchart of a method for optimizing record quality by varying track and linear density to achieve a target storage capacity with clusters of overlapping and non-overlapping data tracks in accordance with one embodiment of the present invention.

Referring now to FIG. 12, a flowchart 1200 of a method for optimizing record quality by varying track and linear density to achieve a target storage capacity with clusters of overlapping and non-overlapping data tracks in accordance with one embodiment of the present invention is shown.

With reference now to blocks 1002 through 1020 of FIG. 12, these blocks are the same as previously described in FIG. 10.

With reference now to blocks 1102 and 1104 of FIG. 12, these blocks are the same as previously described in FIG. 11.

With reference now to block 1202 of FIG. 12 and to FIG. 6, one embodiment provides for writing data to said disk (such as disk 115 in FIG. 1) in a plurality of other clusters 610 separated by guard bands 507, wherein data tracks within said clusters do not overlap. This provides for writing some data using the more conventional manner of non-overlapping tracks. This is useful in cases where some of the data stored can be written sequentially into clusters 605, and some cannot. The non-overwritten tracks 610 provide flexibility for writing and reading data non-sequentially.

Figure 13:
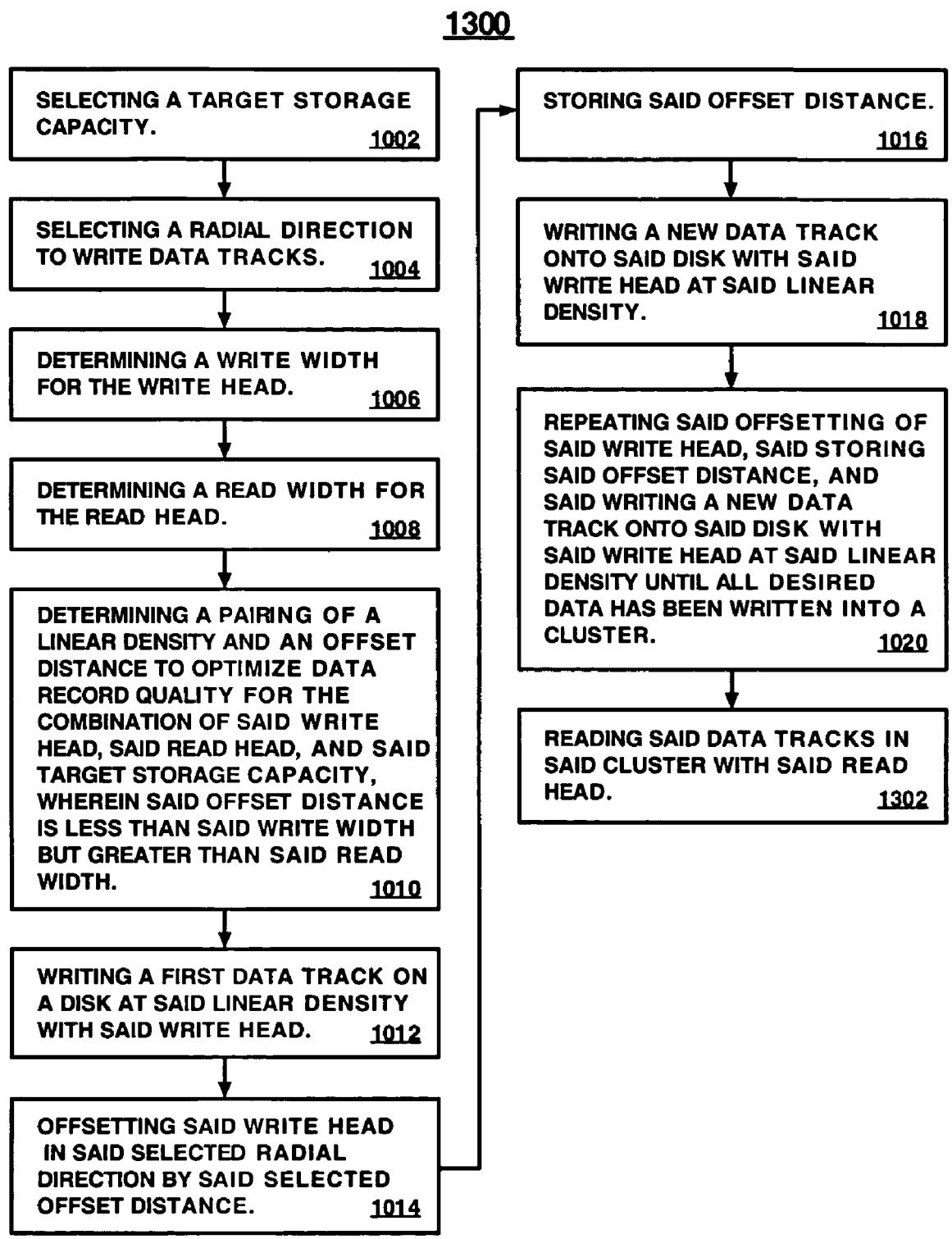
FIG. 13 is a flowchart of a method for optimizing record quality by varying track and linear density to achieve a target storage capacity and then reading the recorded data in accordance with one embodiment of the present invention.

Referring now to FIG. 13, a flowchart 1300 of a method for optimizing record quality by varying track and linear density to achieve a target storage capacity and then reading the recorded data in accordance with one embodiment of the present invention is shown.

With reference now to blocks 1002 through 1020 of FIG. 13, these blocks are the same as previously described in FIG. 10.

With reference now to block 1302 of FIG. 13 and to FIG. 4, one embodiment provides for reading said data tracks in said cluster with said read head 407. This is useful for retrieval of data that has been written. Stored information about the location of the written data tracks, with respect to one another, is used to position the read head 407 above the data tracks for reading the recorded data and/or to offset the read head 407 from track to track as needed.

While the methods of the embodiment illustrated in flow charts 1000, 1100, 1200 and 1300 show specific sequences and quantity of steps, the present invention is suitable to alternative embodiments. For example, not all the steps provided for in the methods are required for the present invention. Furthermore, additional steps can be added to the steps presented in the present embodiment. Likewise, the sequences of steps can be modified depending upon the application.

The alternative embodiments of the present invention, a method and apparatus for optimizing record quality with varying track and linear density by allowing overlapping data tracks are thus described. While the present invention has been described in particular embodiments, it should be appreciated that the present invention should not be construed as limited by such embodiments, but rather construed according to the below claims.

What is claimed is:

1. A method for optimizing data record quality on a disk for a given pair of read and write heads, in which the write head is bigger than the read head, by adaptively varying the linear density and track density of overlapping tracks of data recorded to achieve a target storage capacity, comprising:

selecting a target storage capacity;
selecting a radial direction to write data tracks;
determining a write width for the write head;
determining a read width for the read head;
determining a pairing of a linear density and an offset distance to optimize data record quality for the combination of said write head, said read head, and said target storage capacity, wherein said offset distance is less than said write width but greater than said read width;
writing a first data track on a disk at said linear density with said write head;
offsetting said write head in said selected radial direction by said selected offset distance;
storing said offset distance;
writing a new data track onto said disk with said write head at said linear density; and
repeating said offsetting of said write head, said storing said offset distance, and said writing a new data track onto said disk with said write head at said linear density until all desired data has been written into a cluster.

2. The method of claim 1 further comprising:
leaving a guard band slightly greater than said write width at the end of said cluster; and
writing data to said disk in a plurality of said clusters, each said cluster separated by said guard bands.

3. The method of claim 1 further comprising:
leaving a guard band slightly greater than said write width at the end of said cluster;
writing data to said disk in a plurality of said clusters, each said cluster separated by said guard bands; and
writing data to said disk in a plurality of other clusters separated by guard bands, wherein data tracks within said clusters do not overlap.

4. The method of claim 1 further comprising:
reading said data tracks in said cluster with said read head.

5. A hard disk drive comprising:
a housing;
a disk pack mounted to the housing and having a plurality of disks that are rotatable relative to the housing, the disk pack defining an axis of rotation and a radial direction relative to the axis;
an actuator mounted to the housing and being movable relative to the disk pack, the actuator having a plurality of heads for writing data to the disk pack and reading information from the disk pack; and
a disk drive controller connected to the actuator, write heads, and read heads, said controller configured for optimizing data record quality on a disk for a given pair of read and write heads, in which the write head is bigger than the read head, by adaptively varying the linear density and track density of overlapping tracks of data recorded to achieve a target storage capacity, said optimizing comprising:

selecting a target storage capacity;
selecting a radial direction to write data tracks;
determining a write width for the write head;
determining a read width for the read head;
determining a pairing of a linear density and an offset distance to optimize data record quality for the combination of said write head, said read head, and said target storage capacity, wherein said offset distance is less than said write width but greater than said read width;
writing a first data track on a disk at said linear density with said write head;
offsetting said write head in said selected radial direction by said selected offset distance;
storing said offset distance;

writing a new data track onto said disk with said write head at said linear density; and repeating said offsetting of said write head, said storing said offset distance, and said writing a new data track onto said disk with said write head at said linear density until all desired data has been writing into a cluster.

6. The hard disk drive of claim 5, wherein said disk drive controller is further configured for:

leaving a guard band slightly greater than said write width at the end of said cluster; and writing data to said disk in a plurality of said cluster, each said cluster separated by said guard bands.

7. The hard disk drive of claim 5, wherein said disk drive controller is further configured for:

leaving a guard band slightly greater than said write width at the end of said cluster;

writing data to said disk in a plurality of said clusters, each said cluster separated by said guard bands; and writing data to said disk in a plurality of other clusters separated by guard bands, wherein data tracks within said clusters do not overlap.

8. The hard disk drive of claim 5, wherein said disk drive controller is further configured for:

reading said data tracks in said cluster with said read head.

9. A means for optimizing data record quality on a disk for a given pair of read and write heads, in which the write head is bigger than the read head, by adaptively varying the linear density and track density of overlapping tracks of data recorded to achieve a target storage capacity, comprising:

means for selecting a target storage capacity;

means for selecting a radial direction to write data tracks;

means for determining a write width for the write head;

means for determining a read width for the read head;

means for determining a pairing of a linear density and an offset distance to optimize data record quality for the combination of said write head, said read head, and said target storage capacity, wherein said offset distance is less than said write width but greater than said read width;

means for writing a first data track on a disk at said linear density with said write head;

means for offsetting said write head in said selected radial direction by said selected offset distance;

means for storing said offset distance;

means for writing a new data track onto said disk with said write head at said linear density;

means for repeating said offsetting of said write head, said storing said offset distance, and said writing a new data track onto said disk with said write head at said linear density until all desired data has been written into a cluster.

* * * * *